United States Patent
Jones

[11] 3,893,777
[45] July 8, 1975

[54] STRUCTURAL JOINT
[76] Inventor: Wilson M. Jones, 1703 N. Beckley, Dallas, Tex. 75203
[22] Filed: July 31, 1974
[21] Appl. No.: 493,231

[52] U.S. Cl. .................. 403/268; 264/261; 52/259; 52/309; 264/263
[51] Int. Cl. .......................................... F16b 12/04
[58] Field of Search ............ 403/268, 265; 264/261, 264/263; 52/232, 259, 309, 415, 437; 220/4 R, 4 F, 82 R, 315

[56] References Cited
UNITED STATES PATENTS

| | | | |
|---|---|---|---|
| 2,189,955 | 2/1940 | Hokerk | 229/DIG. 10 |
| 2,392,734 | 1/1946 | Haberstump | 264/263 X |
| 3,323,267 | 6/1967 | Fish | 52/309 |
| 3,451,579 | 6/1969 | Bishop | 220/82 RX |
| 3,645,056 | 2/1972 | Gerola | 52/259 |
| 3,651,975 | 3/1972 | Callan | 220/82 R |

FOREIGN PATENTS OR APPLICATIONS

| 1,505,686 | 1967 | France | 52/309 |
|---|---|---|---|

Primary Examiner—Richard J. Scanlan, Jr.
Assistant Examiner—Wayne L. Shedd
Attorney, Agent, or Firm—H. Mathews Garland

[57] ABSTRACT

A method and apparatus for forming a structural joint connecting adjacent panel members. The invention is especially adapted to use with plastic materials, particularly methyl mathacrylates. The joined panel members may be within a common plane or may lie in planes oriented at angles with respect to each other. Adjacent edges of the members being joined are machined to provide adjacent surfaces defining a mold which is filled with a liquid form of the same material comprising the panels being connected by the joint. Panel edge surfaces which are machined to define the mold into which the bonding material is injected are formed by converging edge surfaces aligned at a relatively steep angle across the bottom of the mold space defined by the edge surfaces to permit ready access for injection of the bonding material. The adjacent panel edge surfaces defining the central and outer portions of the mold space are substantially parallel to each other to provide a minimum volume of the required bonding material. The panels being joined are rigidly supported together at the desired angle so that the bonding material may be introduced into the mold space defined by the machined panel edge surfaces. The liquid bonding material including a catalyst is injected with a hypodermic needle in one or more stages as required depending upon the volume of the material to be introduced. When the material is properly set and cured, the corner formed by the molded joint is cleaned and machined along the outer connecting surfaces providing a joint which is almost visually undetectable so that at most angles the panels appear to be integral.

10 Claims, 8 Drawing Figures

STRUCTURAL JOINT

This invention relates to a method and apparatus for forming a structural joint between connected members and more particularly relates to a cast acrylic joint.

In the past it has been a common practice to join acrylic plastic members by a variety of joint forms including gap joints and joints in which no gap exists. In the gap joints substantial spacing is provided between edge surfaces which are bonded together to form the desired joint. In joints formed without a gap the joining edge and surfaces are essentially brought together with a very thin layer of bonding material cementing the members together along the essentially contacting edge of the surfaces. In the open V-groove joint, which is a gap joint, the member edges to be joined are machined at an angle along each of the members so that the two edge surfaces define a portion of a V-shape with the narrow part of the V still being spaced a substtantial distance apart with respect to the two edges being joined. A strip of cellophane is cemented along the panel surfaces spanning the narrow end of the gap between the members to keep the bonding material introduced from flowing all the way through the gap to permit the gap to be filled with the material. The gap is so filled until a sizeable bead is provided along the top of the gap. After setting, the opposite panel surfaces are machined to remove the excess material. It is dificult to form such a joint without a very noticeable boundary between the connected member. When a gap joint is used to connect members at angles to each other, such as at a 90° angle, the usual V-shaped gap formed between the edge of one of the members and the plane flat side surface of the other member becomes so small at the bottom of the V and so large at the top of the V that problems are presented along both portions of the gap. At the bottom of the V it is difficult to get the bonding material to fully fill the gap without noticeable irregularities caused by shrinkage, while the wide portion of the V-shaped gap uses such a large volume of bonding material that air bubbles readily occur. The sharp angle at which the surfaces come together causes the bonding material as it shrinks during curing to pull inwardly away from the edges that are joined resulting in voids along the joint which produces not only a structurally unsound joint but one that is not appealing to look at. In forming joints which do not utilize a gap, various configurations are used, including the butt joint, an arc joint, a V-groove joint, and a scarf joint. In forming these types of joints, the parts being connected are urged together while the bonding material is setting which often produces a weak joint having uneven distribution of the bonding material. Substantial pressure is required which squeezes the cement out of certain areas. Also enough cement cannot be retained to fully react with each panel to provide an invisible, strong joint. Thus, the joints presently being used, whether they are formed with or without a gap, are not always structurally sound and frequently are not artistically appealing, particularly when clear or translucent colored parts are being joined.

It is therefore a principal object of the invention to provide a new and improved type of structural joint and method for forming same.

It is another object of the invention there to provide a new and improved structural joint and method for forming same between acrylic plastic parts.

It is another object of the invention to provide a new and improved form of acrylic plastic joint which does not have the objectionable features of conventional gap joints or butt-type joints.

It is another object of the invention to provide an acrylic plastic structural joint and a method for forming same which does utilize a sufficiently small volume of bonding material to prevent imperfections such as bubbles from forming in the material during curing.

It is another object of the invention to provide an acrylic plastic joint in which the edges of the connected parts do not come together at such a small angle that the bonding material shrinks away from the joint edges.

It is another object of the invention to provide a new and improved form of cast acrylic plastic joint and a method for forming same.

It is another object of the invention to provide a cast acrylic plastic joint in which at least one of the edge surfaces being connected is machined to a fairly substantial convergent open angle along the bottom portion of the mold space between the connected parts and is machined to a substantially parallel relationship along the outer portions of the mold formed by the edge surfaces.

It is another object of the invention to provide a method of forming a joint between acrylic plastic parts which includes forming the parts to provide at least one of the parts with edge surfaces having a substantial angle or arc along a first lower portion of the edge which joins the connecting member and a surface along the central and outer portion of the edge which is substantially parallel to the adjacent surface of the member being joined.

In accordance with the invention is provided a method and apparatus for forming a cast joint between acrylic plastic members wherein a liquid bonding material having the same characteristics as the material of the joined parts is used to form a cast joint between the connected parts. The adjacent edges of the parts to be joined together are machined to define a mold in which an inhibited liquid form of the acrylic plastic containing a catalyst is injected to provide a connecting strip which cures to join the members integral with each other providing a joint which is at least as strong as the parts being joined and which may be machined to be essentially invisible.

The invention along with foregoing objects and advantages will be better understood from the following detailed description of preferred embodiments of the invention taken in conjunction with the accompanying drawings wherein.

Figure 1:
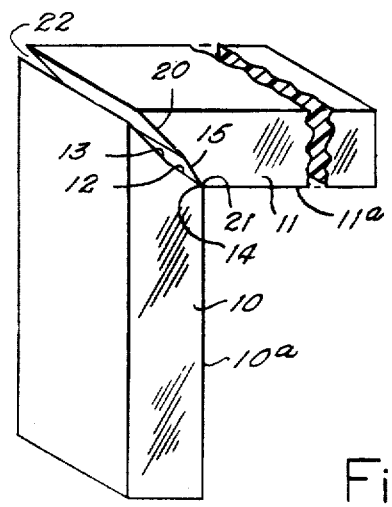
FIG. 1 is a fragmentary view in perspective of two acrylic plastic parts properly prepared for joining to illustrate the first step in the formation of a structural joint between such parts formed in accordance with the method of the invention.

Referring to FIG. 1 of the drawings, a first panel member 10 is joined to a second perpendicular panel member 11 by properly preparing adjacent edge surfaces of the members along the line of connection at the corner defined where the members are joined together to provide a mold for casting the bonding material which connects the two members together. In the preferred form of the invention the parts will be described as being formed of methyl methacrylate joined by a compatible bonding agent which comprises a form of the same material as the joined parts. The members 10 and 11 are first very accurately machined along the edge surfaces that are to be connected to provide edge surfaces which will define the desired mold shape for casting the joint. As shown in FIG. 10, the upper end edge of the member is machined to provide the first edge surface 12 and the second edge surface 13 formed at angles with the opposite faces of the member and with each other to provide the proper final shape of mold space desired between the members. The corner edge 14 formed at the junction between the edge surface 12 and the inside face 10a of the member 10 must be a very straight, sharp, clean edge. Similarly, the member 11 is provided with a pair of edge surfaces 15 and 20 corresponding with the edge surfaces 12 and 13 on the member 10. The member 11 has an inside corner edge 21 at the junction of the surface 15 with the inside face 11a of the member which also must be a very straight, clean, sharp edge. The two members 10 and 11, after the edge surfaces which are to be joined, the surfaces 12 and 13 on the member 10 and the surfaces 15 and 20 on the member 11 are properly machined, are supported in any suitable jig, not shown, for holding and aligning the members in the relationship illustrated in FIG. 1. Such a jig may be a vise where small parts are joined. Where large sheets are joined, a box-shaped work bench may be used having a horizontal top surface and vertical side walls so that, for example, the member 11 would be placed on the vertical top surface of the workbench while the member 10 would be clamped to one of the vertical side walls of the workbench positioned so that the edge surfaces 12 and 13 and 15 and 20 respectively would be properly oriented. In this relationship the sharp corner edges 14 and 21 of the two members are brought together so that they are in contact along the full length of the corner edges across the width of the members as seen in FIG. 1. With the members to be joined so supported, the edges 12 and 13 and 15 and 20 define an upwardly opening mold space 22 between the edge surfaces. The edge surfaces machined to provide the mold are formed at such angles on the members 10 and 11 that when the members are assembled on the jig as illustrated in FIG. 1, the surfaces 12 and 15 will form a fairly wide angle between the surfaces. The edge surfaces 12 and 15 are spaced by virtue of the angle between them sufficiently apart to permit the ready flow of the liquid bonding material into the mold space to the line of contact between the corner edges 14 and 21. The exact preferred degree of the angle between the surfaces 12 and 15 is not readily determinable as the basic objective of providing the divergent surfaces is to allow sufficient space between the surfaces to inject the bonding liquid so that it will freely flow to the bottom of the mold space uniformly filling the space down to the line of contact between the corner edges 14 and 21. The space between the angle surfaces 12 and 15 must be sufficient to avoid shrinkage in the bonding material as it cures which might result in a structurally weak joint and also is visually undesirable. The surfaces 13 and 20 are, however, aligned parallel to each other for the purpose of reducing the total volume of the mold 22 so that shrinkage of the mass of the bonding material is minimized hopefully eliminating the development of bubbles or voids within the liquid material as it cures. Ideally, the spacing between the parallel surfaces 13 and 20 is maintained constant irrespective of the thickness of the panels joined. As a practical matter, the preferable spacing has been found to be about one-sixteenth of an inch which provides sufficient space to permit ready injection of the liquid bonding material but is not so large that the volume of the material causes major shrinkage problems.

After the panels 10 and 11 have been properly machined and supported together as illustrated in FIG. 1, the liquid bonding material is prepared for injection into the mold space 22 to form the cast joint between the panels. The resin which is used and which has identical characteristics to the material forming the panels 10 and 11 is designated "PS-30 Component A" supplied by Cadillac Plastic and Chemical Company. The resin is in liquid form including an inhibitor which prevents its setting until it is mixed with a catalyst. The catalyst which is employed is also furnished by Cadillac Plastic and Chemical Company under the designation "PS-30 Component B". The resin and catalyst are mixed in a ratio of one part catalyst to 20 parts resin. The mixture is preferably stirred in a blender for a period of about 3 minutes. The stirred mixture is then placed in a chamber for about 6 minutes under a vacuum of about 23 to 24 inches of mercury to draw out the solution any gasses and air that were trapped in the liquid mixture during the blending step. The liquid mixture is of the consistency of fairly viscous syrup in which entrained air and gas in the form of bubbles rise to the surface of the liquid in response to the vacuum. A frothy layer develops on the surface which is readily skimmed off with a tool such as a spoon leaving the remainder of the liquid free of gasses and air bubbles. The mixture is then placed in a hypodermic syring 30, FIG. 2, equipped with a needle 31 preferably of a size 16. The syringe is connected with a hose 32 leading to a suitable air supply, not shown, so that air may be forced into the syringe behind the liquid bonding material to expel the material through the needle 31. A quantity of bonding agent which can normally be handled within the time available between mixing and setting requires a 30 cc syringe.

Figure 2:
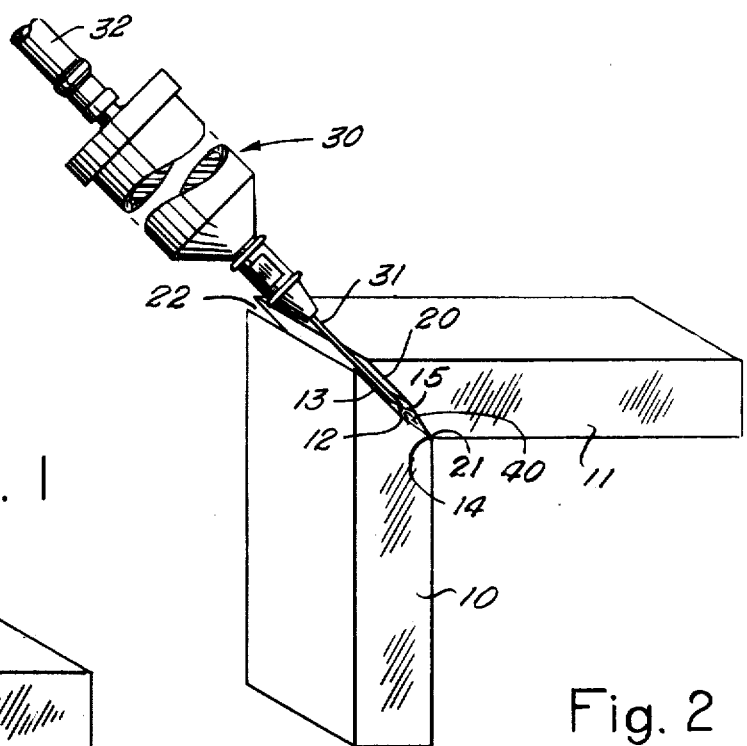
FIG. 2 is a fragmentary perspective view similar to FIG. 1 showing the second step of injecting the bonding material into the mold defined by the machined edges of the parts to be connected.

With the properly mixed bonding agent in the syringe 30, the tip end of the needle 31 is inserted into the mold space 22 between the end edges of the members 10 and 11 which are to be joined. The needle tip is preferably held somewhat away from the bottom of the mold space as shown in FIG. 2 approximately the depth of the pour to be made. The syringe and needle are then moved longitudinally along the length of the mold space injecting the bonding agent, making the first pour of the agent which is designated in FIG. 2 by the reference numeral 40. The liquid is injected slowly and steadily by the air pressure applied to the tube 32 into the syringe. Extreme care is taken to minimize the formation of air bubbles as the bonding agent is flowed into the mold space. If a bubble appears, the needle may be inserted into the air space caused by the bubble and additional bonding agent injected to eliminate the bubble. The agent is introduced until the first pour 40 extends along the full length of the mold space 22. If the edges 14 and 21 of the members 10 and 11 respectively are properly supported together along the full length of the bottom of the mold space, none of the liquid injected to form the first pour 40 will flow through to the inside faces of the panel member 10 and 11. It is extremely important that this contact between the edges 14 and 21 be made along the full length of the edges, particularly in those instances where a square or triangular column is being made which is relatively small because there is no way to get inside along the inside faces of the panel members forming such a column to clean the joint along the edges 14 and 21.

In making the first bonding agent pour 40, care is taken to insure that the pour is not too deep which would introduce an excess volume bonding agent which could cause problems during the curing of the agent. As previously discussed, when too great a volume of the bonding agent is introduced at one time, the shrinkage which occurs will create a bubble condition which, if not corrected, is both objectionable aesthetically and, additionally, tends to create a weak joint. The precise amount of bonding agent which makes up the first pour 40, either in volume or in terms of the percentage of the depth of the mold space 22 into which the pour is made, is not readily determinable but rather is arrived at through trial and error with experience. It has been found generally that, as a practical matter, this first pour is preferably made to the extent that it fills the mold space 22 upwardly along the width of the angular mold surfaces 12 and 15 to the point of the beginning of the parallel surfaces 13 and 20.

After the full first pour 40 has been made, the bonding agent begins the process of curing or setting-up which involves a chemical reaction causing the material to get extremely hot to the point of some degree of boiling. It is for this reason that if the volume of the material in the first pour is too great, air pockets will be formed within the pour. Should such air pockets develop during the curing, the tip end of the needle is reinserted into the material into the space created by the air pocket and additional bonding agent is injected into the space. The first pour is allowed to cure for a period which may range from about 10 minutes to about 30 minutes. One measure of the condition of the bonding agent after which the next pour is normally made is the degree of firmness of the surface of the agent along the first pour. This surface will attain a condition of firmness which will permit the tip end of the hypodermic needle to touch the surface depressing it slightly without, however, penetrating into the body of the pour with normal hand pressure. At this point, the next pour may be made. It has been found that while the preferred period of 30 minutes curing time for the first pour may be exceeded, the bonding agent cannot be permitted under any circumstances to cure more than about 2 hours. When the agent cures in excess of 2 hours, the next pour will not react and blend with it to form a homogeneous fill in the mold space. The curing material increases in temperature reaching a peak and starting a cooling-off period when the next pour is made. If the material has been thoroughly and properly mixed and the pour has been carefully made without excessive volume of material introduced into the mold space, the bonding agent will go through the heat cycle to the point of cooling down to a condition at which the next pour may be made without the formation of air bubbles.

After the first pour has properly been cured, the second pour is then made. The number of pours which will be necessary will obviously depend upon the thickness of the material forming the panels 10 and 11. It has been found that in half-inch material, the cast joint is formed in two pours. The second pour is made along the top of the first pour with the hypodermic needle 31 being moved along the mold space 22 above the first pour between the parallel wall surfaces 13 and 20. The needle is moved the length of the mold space 22 filling the space until there is some slight overfill allowing some of the material to spill over to the outer panel surfaces of the two members 10 and 11. This spill-over is permissable because the outer surfaces of the panel members are readily accessible for cleaning and machining after the joint has fully cured. Again care is taken to inject the bonding agent at a rate and in a manner which will minimize if not eliminate the formation of air bubbles. Some manipulation laterally and inwardly and outwardly may be necessary as the needle is moved along the length of the mold space to evenly fill the space to the point of the slight overfill. If an air bubble develops during the pour, the needle is inserted into the void space formed by the bubble to fill the space with additional bonding agent. To minimize spillover at the ends of the mold space 22, a small strip of tape or a plate of abcite, which is a material inert to the resin comprising the bonding agent, is taped to the edges of the members 10 and 11 across the opposite open ends of the mold space 22 to form a dam or a closure at each end of the mold space 22.

Figure 3:
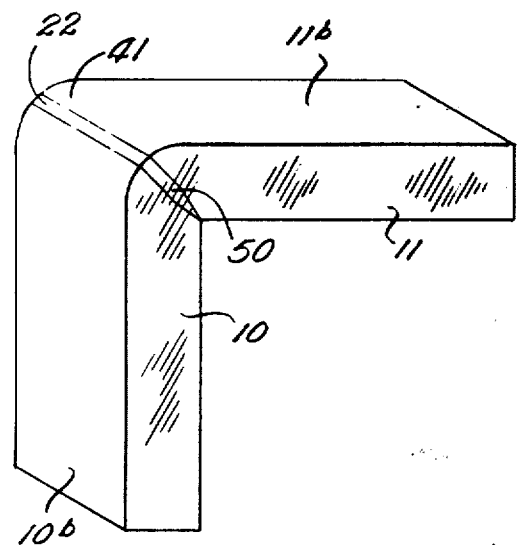
FIG. 3 is a fragmentary perspective view showing a completed cleaned and machined joint between the connected parts.

At the completion of the second pour, which in half-inch thick material is the last pour, the cast joint is allowed to cure for a period of at least 24 hours to harden sufficiently that the joint may be machined. During the initial curing and the subsequent hardening period, the injected resin reacts with the parent material forming the panel members 10 and 11 and the several pours react with each other to the extent that an essentially homogeneous body of material is formed at the joint by the injected bonding agent and the material forming the panels so that the joint becomes essentially invisible and develops a strength which generally will exceed that of the panel members 10 and 11 themselves. After the 24 hour setting period the cast joint and panel members are machined on a radius 41 which provides a smooth contour between the two outer surfaces 10b and 11b of the panel members and the cured joint material as shown in FIG. 3. While it would be possible to place additional mold members at the corner joint to hold the injected resin to create an actual square edge along the joint, it is not practical and thus it is normally necessary that the joint be finished by machining to form the radius 41 shown in FIG. 3. The completed cast portion 50 of the joint thus formed is represented by phantom lines in the FIG. 3 which are used to outline the limits of the cured bonding agent after the mold space 22 is filled, the material is cured, and the joint has been machined to the contour shown, though it is to be understood that the joint is essentially invisible from most angles and generally its limits can only be seen by very close examination of the opposite ends of the joint along the side edges of the panels 10 and 11. The joint becomes so homogeneous with the parent material forming the panels 10 and 11 that the two panels appear to the eye as an integral member when looking other than at the opposite ends of the joint. When desired, four panel members such as 10 and 11 may be placed together to form a column or beam rectangular in cross section which is particularly useful in various types of display fixtures, furniture, and other structures which desirably might be made of a transparent or translucent methyl mathacrylate.

Other forms of joints which may be constructed to connect together two or more members in accordance with the invention are illustrated in FIGS. 4–8.

Figure 4:
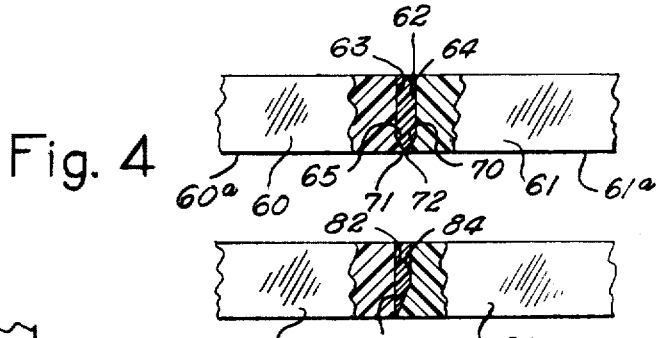
FIG. 4 is a fragmentary edge view partially broken away in section of two parts in the same plane joined by one form of joint in accordance with the invention.

Referring to FIG. 4, two panel members 60 and 61 are joined together in the same plane by a "butt type" cast joint 62 formed in accordance with the previous description by injecting liquid bonding agent into the mold space defined by the adjacent edges of the two panel members. Such mold space is bounded by the parallel surfaces 63 and 64 formed on the adjacent edges of the members 60 and 61, respectively, and the convergent angular surfaces 65 and 70 formed on the members. The surfaces 65 and 70 taper inwardly toward each other joining the bottom panel surfaces 60a and 61a of the members 60 and 61 to form sharp edges 71 and 72 on the panel members. The angle between the converging surfaces 65 and 70 is sufficiently large to permit the ready flow of the bonding agent into the space along the bottom of the mold. The space between the parallel surfaces 63 and 64 is wide enough that the hypodermic needle may be readily inserted to fill both the angular bottom portion and the parallel portion of the mold space. The spacing between the surfaces 63 and 64 must be adequate to allow a sufficient volume of the bonding agent to be introduced into the mold space to fully react with the adjacent panels 60 and 61 to form the homogeneous joint. This obviates the problem normally encountered in conventional butt joints where there is not adequate bonding agent between the contacting surfaces to fully react with the parent material of the panels to form a homogeneous joint. The pouring, curing, and finishing of the joints represented in FIG. 4 is accomplished in the same steps and by the same techniques described with respect to the joint shown in FIGS. 2 and 3.

Figure 5:
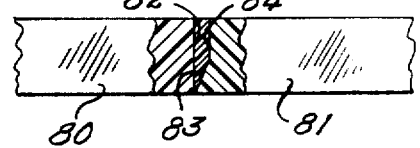
FIG. 5 is a fragmentary edge view partially broken away in section showing another form of cast acrylic joint formed in accordance with the invention.

Another form of butt type joint which may be made in accordance with the invention is illustrated in FIG. 5 which shows the joinder of the panel members 80 and 81 by providing a mold space between the panel members defined by a machined square end edge 82 on the member 80 and an end edge formed by the angular surface 83 and the adjoining square surface 84 on the panel member 81. It has been found that generally with the butt type joint, the connection between panel members as shown in FIGS. 4 and 5, the mold space may be provided by using angular surfaces, such as the surface 83, on the end edges of only one of the panel members. In this manner sufficient space can be provided to allow even flow of the bonding agent into the space along the bottom of the mold formed between the adjacent edges of the members and the pour may be completed in the usual manner between the parallel surfaces provided. Both of the joints shown in FIGS. 4 and 5 result in a connection between the members which is essentially invisible except at the end edges of the cast joints.

Figure 6:
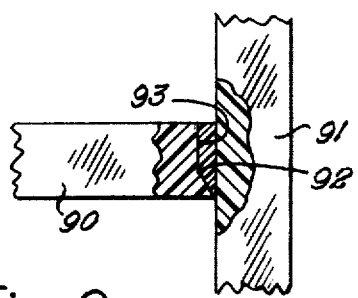
FIG. 6 is a fragmentary edge view in section and elevation partially broken away, showing a joint formed in accordance with the invention between perpendicular members where an edge of one member is connected to a side panel face of the other member.

A still further form of cast joint embodying the invention is illustrated in FIG. 6 where a first panel member 90 is joined at an end edge to a flat side face of a second perpendicular panel member 91 in a manner which might be used in the construction of shelves between the vertical support members. In the joint shown in FIG. 6, as in that of FIG. 5, the end edge only of the member 90 is machined to provide the angular surface 92 defining a side of the lower portion of the mold space and the parallel surface 93 defining a side of the upper portion of the mold space. The joint illustrated in FIG. 6 is cast in the same manner as previously described while the members 90 and 91 are held by a suitable jig until the joint is sufficiently cured for cleaning up.

Figure 8:
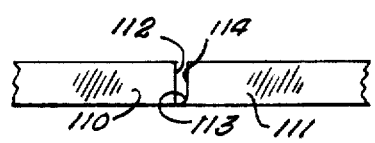
FIG. 8 is a fragmentary edge view showing the preparation of the machined edges of another pair of relatively thin parts joined together in the same plane in accordance with the invention.
Figure 7:
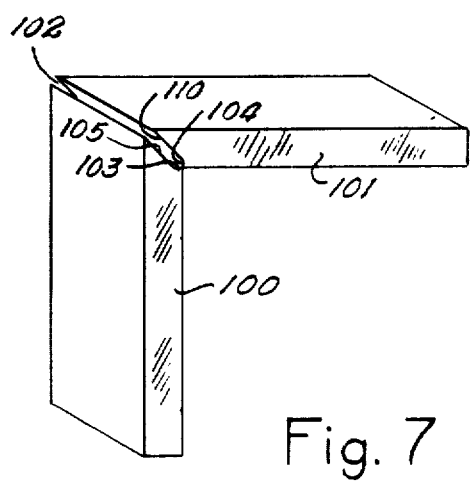
FIG. 7 is a fragmentary view in perspective illustrating the preparation of the connected edges of relatively thin parts which are joined together at a 90° angle in accordance with the invention.

A still further form of joint construction incorporating the features of the invention is represented in FIGS. 7 and 8 for use in the connection of thin panel members which present difficulties in using the convergent plane surfaces such as 12 and 15 in FIG. 1 and as shown in the other joints. The angular surfaces are difficult to machine on end edges of material which is only ¼ inch thick. Referring to FIG. 7, a pair of panel members 100 and 101 are connected together by provision of a mold space 102 defined between the adjacent edges of the panel members. The mold space in this instance, however, is defined by arcuate convergent surfaces 103 on the panel member 100 and 104 on the panel member 101. The surfaces 103 and 104 correspond in function to the surfaces 12 and 15 in the form of joint shown in FIG. 1. The members 100 and 101 are also provided with parallel edge surfaces 105 and 110, respectively, which correspond with the parallel surfaces in the other joints described herein. It has been found that with thin members such as about ¼ inch thick, the convergent surfaces 103 and 104 formed on a radius rather than being plane surfaces are easier to cut and provide the desired mold space at the bottom of the mold better than the use of the plane surfaces. The mold space 102 is filled in the same manner as previously described, though it is sufficiently shallow and of such a small volume that generally it may be filled in one pour rather than using two or more as required in the other joints using thicker material such as one-half inch or more. With the exception of the use of the arcuate convergent surfaces 103 and 104, the joint construction and the procedures followed in preparing and forming the joint shown in FIG. 7 are identical to those previously described.

Another type of joint for forming a butt connection between relatively thin panel members is shown in FIG. 8. The members 110 and 111 are connected by a cast joint in which the mold space is defined between the end edges of the members by a convergent arcuate surface 113 and a straight surface 114 on the panel member 111 along with a square end edge 112 on the panel member 110. This configuration of the surfaces defining the mold space between the members is functionally identical to that of FIG. 5 with the bottom portion of the mold space having adequate room for even flow of the bonding agent into the mold and the parallel surfaces 112 and 114 providing the required space while minimizing the volume of bonding agent necessary. The pouring and curing of the bonding agent in the joint in FIG. 8 is the same as that previously discussed, and generally with such thin material may be accomplished in a single application of the bonding agent.

It will be evident from the foregoing description of the strucure of and the techniques used in forming the joints described that the major advantage of joint strength and visual acceptability resides in the use of surfaces which form the mold for the cast joint which allow free flow of the bonding material to the bottom of the joint while minimizing the total volume of the material forming the joint to eliminate the problems of air pockets which are formed during the normal curing of large volumes of the bonding agent. The previous joints used either had plane surfaces formed at an angle which defined a mold of excessive volume, or the surfaces in butt joints, for example, placed in contact with each other do not allow a sufficient quantity of bonding material to form a homogeneous joint by reaction of the bonding material with the parent material of the panels being connected. The present invention overcomes the drawbacks of the conventional joints by defining the bottom of the mold space by at least one convergent surface and defining the remainder of the mold space by parallel surfaces which permits ready access to the bottom of the mold space while minimizing the total volume of the mold space.

What is claimed is:;

1. A cast joint between at least two plastic body members comprising: means providing a mold space between said members along said joint, said mold space being defined by spaced edge surfaces on said members, an outer portion of said mold space along the length of said space between said members being defined by parallel spaced edge surfaces on said members and an inner bottom portion of said mold space being defined by two surfaces at least one of which is a surface converging with the other of said two surfaces to a line of contact along the length of the bottom of said mold space; and a bonding agent in said mold space between said two body members, said bonding agent being of the same material comprising said two body members and initially being in a liquid form including an inhibitor, said liquid form being mixed with a catalyst and being introduced into said mold space, said liquid bonding agent with said inhibitor and said catalyst being cured within said mold space reacting with said material forming said two members along the boundary of said bonding agent and said edge surfaces of said members defining said mold space whereby said bonding agent and said body members form a homogeneous continuous integral mass.

2. A cast joint in accordance with claim 1 wherein said converging surface is a planar surface aligned at an angle with and contiguous with one of said parallel spaced surfaces.

3. A cast joint in accordance with claim 1 wherein said converging surface is an arcuate surface contiguous with one of said parallel surfaces.

4. A cast joint in accordance with claim 1 wherein both of said surfaces defining said inner bottom portion of said mold space are planar surfaces each contiguous with and extending at an angle to one of said parallel surfaces defining said outer portion of said mold space.

5. A cast joint in accordance with claim 1 wherein both of said surfaces defining said bottom portion of said mold space are arcuate surfaces curved toward each other joining at said bottom line of contact and each contiguous with one of said parallel surfaces defining said outer portion of said mold space.

6. A cast joint in accordance with claim 1 wherein said material comprising said two members is methyl methacrylate.

7. A cast joint in accordance with claim 2 wherein the material comprising said two members is methyl mathacrylate.

8. A cast joint in accordance with claim 3 wherein said material forming said two members is methyl methacrylate.

9. A cast joint in accordance with claim 4 wherein said material comprising said two members is methyl methacrylate.

10. A cast joint in accordance with claim 5 wherein said material forming said two members is methyl methacrylate.

* * * * *